(12) United States Patent
Dai

(10) Patent No.: US 10,481,777 B2
(45) Date of Patent: Nov. 19, 2019

(54) FULLY DESIGNABLE VEHICLE INFORMATION PANEL INTERFACE

(71) Applicant: THUNDER POWER NEW ENERGY VEHICLE DEVELOPMENT COMPANY LIMITED, Central (HK)

(72) Inventor: Yu-Ting Dai, New Taipei (TW)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 61 days.

(21) Appl. No.: 15/799,795

(22) Filed: Oct. 31, 2017

(65) Prior Publication Data

US 2018/0067634 A1 Mar. 8, 2018

Related U.S. Application Data

(63) Continuation of application No. 14/979,494, filed on Dec. 27, 2015, now Pat. No. 9,851,882.

(51) Int. Cl.
*G06F 3/00* (2006.01)
*G06F 3/0484* (2013.01)
(Continued)

(52) U.S. Cl.
CPC .......... *G06F 3/04845* (2013.01); *B60K 35/00* (2013.01); *B60K 37/02* (2013.01);
(Continued)

(58) Field of Classification Search
CPC .. G06F 3/04842; G06F 3/0484; G06F 3/0482; G06F 3/0481; G06F 3/04817;
(Continued)

(56) References Cited

U.S. PATENT DOCUMENTS 8,483,907 B2 * 7/2013 Tarte ................... B60K 35/00
701/36
9,104,537 B1 8/2015 Penilla et al.
(Continued)

FOREIGN PATENT DOCUMENTS

WO 2013/130036 A1 9/2013

OTHER PUBLICATIONS

European Search Report for EP16206159 dated May 16, 2017, all pages.

*Primary Examiner* — Di Xiao
(74) *Attorney, Agent, or Firm* — Kilpatrick Townsend & Stockton, LLP

(57) ABSTRACT

Provided are systems and methods for facilitating a user to configure and retrieve personalized settings for a fully designable information panel in a driving apparatus. The information panel system may be configured to store a plurality information panel configurations. Different information panel configurations may correspond to different users of the driving apparatus. Users may be identified when inside the driving apparatus by capturing their biometric information. Following identification, an information panel configuration corresponding to the identified user may be retrieved and configured on a display device. The displayed information panel configuration may include a user customized graphic. The user customized graphic may be modified by the identified user with a color, shape, or text modification. The modification may be dependent on different metrics regarding vehicle operation or performance.

18 Claims, 8 Drawing Sheets

(51) Int. Cl.

| | |
|---|---|
| *G06F 9/451* | (2018.01) |
| *B60K 35/00* | (2006.01) |
| *G06F 3/01* | (2006.01) |
| *G06F 3/0481* | (2013.01) |
| *G06F 3/0488* | (2013.01) |
| *G06T 11/60* | (2006.01) |
| *B60K 37/02* | (2006.01) |
| *B60K 37/06* | (2006.01) |
| *G06F 8/38* | (2018.01) |
| *G06F 9/445* | (2018.01) |

(52) U.S. Cl.
CPC ............ *B60K 37/06* (2013.01); *G06F 3/015* (2013.01); *G06F 3/0481* (2013.01); *G06F 3/04883* (2013.01); *G06F 8/38* (2013.01); *G06F 9/4451* (2013.01); *G06F 9/451* (2018.02); *G06T 11/60* (2013.01); *B60K 2370/11* (2019.05); *B60K 2370/122* (2019.05); *B60K 2370/1438* (2019.05); *B60K 2370/151* (2019.05); *B60K 2370/155* (2019.05); *B60K 2370/164* (2019.05); *B60K 2370/167* (2019.05); *B60K 2370/195* (2019.05); *B60K 2370/52* (2019.05); *B60K 2370/73* (2019.05); *B60K 2370/736* (2019.05); *B60K 2370/741* (2019.05); *B60K 2370/744* (2019.05)

(58) Field of Classification Search
CPC .. G06F 3/0488; G06F 3/04847; G06F 3/0486; G06F 3/04883; G06F 3/04886; G06F 17/241; G06F 3/04845; G06F 3/1454; G06F 17/30; G06F 21/32; G06F 2203/04803; G06F 3/017; G06F 3/04815; G06F 17/24; G06F 17/30867; G06F 21/31; G06F 21/84; G06F 2203/04808; G06F 15/17306; G06F 17/2247; G06F 17/2288; G06F 17/30011; G06F 17/30247; G06F 17/30554
See application file for complete search history.

(56) References Cited

U.S. PATENT DOCUMENTS

| | | | |
|---|---|---|---|
| 9,223,340 B2 * | 12/2015 | Locker | ................ G06F 1/1605 |
| 9,229,905 B1 * | 1/2016 | Penilla | .................... G06F 17/00 |
| 9,851,882 B2 | 12/2017 | Dai | |
| 2004/0095382 A1 | 5/2004 | Fisher et al. | |
| 2014/0200737 A1 | 7/2014 | Lortz et al. | |
| 2015/0057839 A1 | 2/2015 | Chang et al. | |
| 2015/0106739 A1 | 4/2015 | Tan et al. | |
| 2015/0178034 A1 * | 6/2015 | Penilla | .................... G06Q 20/18 |
| | | | 345/1.1 |
| 2016/0274717 A1 * | 9/2016 | Wako | .................... G06F 3/0488 |
| 2017/0185266 A1 | 6/2017 | Dai | |

* cited by examiner

FULLY DESIGNABLE VEHICLE INFORMATION PANEL INTERFACE

CROSS-REFERENCE TO RELATED APPLICATION

The present application is a continuation of U.S. Nonprovisional application Ser. No. 14/979,494, filed Dec. 27, 2015, the disclosure of which is hereby incorporated by reference in its entirety for all purposes.

BACKGROUND

The present disclosure generally relates to configuring display devices in vehicles, and more specifically to personalized configuration of display devices in vehicles using user biometric information.

Vehicles, such as automobiles, have a wide range of controllers and gauges that may be visualized and adjusted inside a vehicle cabin. Vehicle controllers give the vehicle driver and/or passenger the ability to adjust one of several adjustable components. Examples of such adjustable components include mirrors (side and rear), seats, steering wheels, air temperature, air magnitude, radio, headlights, brakes, engine (e.g., economy or sports mode), among others. An automobile with adjustable components can typically facilitate a person entering the automobile (e.g., a driver) to manually select and set his/her preferred settings for the adjustable components. For example, a female driver entering the automobile can be facilitated to adjust various levers to position the seat properly for her body type. She can also be facilitated to set the steering wheel to an angle for ease of use, adjust the rear and side-view mirrors her height, select a favorite station on the radio, and/or select any of the additional personal settings.

Vehicle gauges, on the other hand, give the vehicle driver and/or passenger the ability to examine certain metrics regarding vehicle operation or performance. Examples of such gauges include speedometers, tachometers, oil pressure gauges, temperature gauges, voltmeters, odometers, ammeters, fuel pressure gauges, brake pressure gauges, check engine indicators, among others. Vehicle gauges may be displayed either using an analog or electronic display. Types of electronic displays include CRT, LED, OLED, LCD, and plasma technologies, among others. Electronic displays in vehicles can display still images or video.

SUMMARY

Provided are systems and methods for facilitating a user to configure and retrieve personalized settings for a fully designable information panel in a driving apparatus. Some embodiments of the present disclosure include a system which includes a processor that is configured to store a plurality of information panel configurations for users of the driving apparatus. The plurality of information panel configurations may include a first information panel configuration for a first user of the driving apparatus and a second information panel configuration for a second user of the driving apparatus.

In some embodiments, the first information panel configuration includes a first user customized graphic, and the second information panel configuration includes a second user customized graphic. The first and second user customized graphics may be previously modified by the first and second users on a computing device. In addition, the first and second user customized graphics may be previously modified with a plurality of color, shape, or text modifications. In some embodiments, at least one of the plurality of color, shape, or text modifications is visually dependent on a metric regarding vehicle operation or performance. The processor may be further configured to effectuate configuring the first information panel configuration on a display device, and to effectuate configuring the second information panel configuration on the display device.

In some embodiments, the plurality of color, shape, or text modifications include a modification of either a vehicle gauge or controller. The first and second users may modify existing first and second user customized graphics. The existing first and second user customized graphics may not be originally created by the first and second users. In some embodiments, the first and second user customized graphics may be previously modified using a pixel-based editing approach. In some embodiments, the first and second user customized graphics may be previously modified using a vector-based editing approach.

In some embodiments, the processor may be further configured to identify the first user when the first user is inside the driving apparatus. Following identification of the first user, the first information panel configuration may be retrieved. The processor may be further configured to identify the second user when the second user is inside the driving apparatus. Following identification of the second user, the second information panel configuration may be retrieved.

In some embodiments, the first and second users are identified by receiving biometric information regarding the first and second users. The biometric information that is received may be captured by a fingerprint scanner or a camera. In some embodiments, the first and second users are identified by receiving information from an input device that is configured to allow the first and second users to identify themselves. In some embodiments, the input device is a touch screen that is incorporated into the display device. In some embodiments, the plurality of information panel configurations are stored in a remote storage over a network.

Systems and methods of the present disclosure may also include a computer-method for configuring a driving apparatus, and a non-transitory processor-readable medium comprising instructions that, when executed by one or more processors, cause the one or more processors to perform several operations.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

Figure 1:
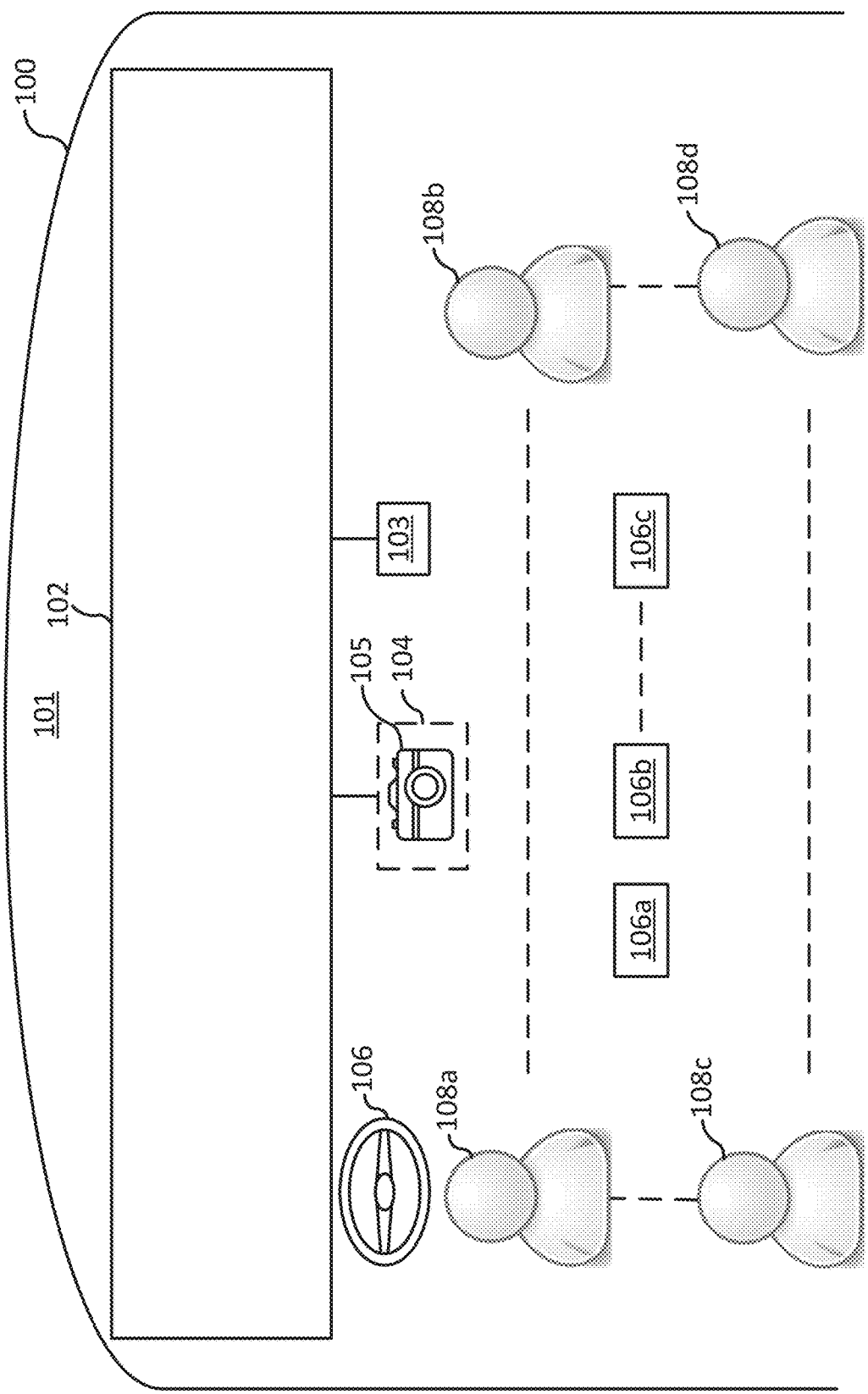
FIG. 1 illustrates a transportation apparatus, according to an exemplary embodiment of the present disclosure.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

Various example embodiments of the present disclosure will be described below with reference to the drawings constituting a part of the description. It should be understood that, although terms representing directions are used in the present disclosure, such as "front", "rear", "upper", "lower", "left", "right", and the like, for describing various exemplary structural parts and elements of the present disclosure, these terms are used herein only for the purpose of convenience of explanation and are determined based on the exemplary orientations shown in the drawings. Since the embodiments disclosed by the present disclosure can be arranged according to different directions, these terms representing directions are merely used for illustration and should not be regarded as limiting. Wherever possible, the same or similar reference marks used in the present disclosure refer to the same components.

Traditional vehicle electronic displays, often referred to as digital instrument panels or electronic instrument clusters, typically have a built-in layout that is configured by the manufacturer. Any customizations permitted by these electronic displays are minimal, and generally apply to all users of the vehicle without the ability to store and later retrieve through a user profile. Therefore, it is desirable to provide new systems and methods for configuring display devices in vehicles.

In accordance with the disclosure, a fully designable information panel in a driving apparatus may be facilitated. Biometrics, such as a fingerprint, retina pattern, voice pattern and/or any other biometric information of a certain user of the driving apparatus may be captured to identify the user. The user may be associated with several information panel configurations such that the user may configure and store an information panel configuration, and then later retrieve or update the same information panel configuration. FIG. 1 illustrates one example of a driving apparatus 100 that allows a user to provide his/her biometric information to store, retrieve, and/or update their personalized settings for an information panel.

As shown, driving apparatus 100 in accordance with the disclosure may include a processor 103 configured to execute machine-readable instructions. The machine-readable instructions, when executed, can cause processor 103 to perform one or more operations to implement storing, recalling and/or updating the personalized settings of an information panel in the driving apparatus 100. As shown, processor 103 may be operatively connected to one or more user identifying devices 104, such as a biometric information capturing device 105 which is shown in FIG. 1 as a camera. The biometric information capturing device 105 can be configured to acquire biometric information from a user of the driving apparatus 100. In some embodiments, the biometric information capturing device 105 may be configured to identify the user based on the biometric information provided by the user. However, this is not necessarily the only case. In some embodiments, the biometric information capturing device 105 may not identify the user. In those embodiments, the biometric information capturing device 105 may be configured to simply transmit the captured user biometric information to processor 103 for further processing.

In some embodiments, the user identifying device 104 need not include a biometric information capturing device. Users may identify themselves by entering information into the information panel or some other input device. For example, users may identify themselves using a keypad located on the inside of the vehicle. In some embodiments, a keypad located on the outside of the vehicle may simultaneously provide entry to the user and identify which user is entering the vehicle. Similarly, users may identify themselves using a key to the vehicle that is unique for different users. In some embodiments, users may say their name to a microphone inside driving apparatus 100 to identify themselves.

As shown, driving apparatus 100 may comprise information panel 102. In some embodiments, information panel 102 may be an electronic display that spans the dashboard of driving apparatus 100. Types of electronic display technologies that may embody information panel 102 include CRT, LED, OLED, LCD, and plasma technologies, among others. In some embodiments, driving apparatus 100 may comprise multiple information panels 102 positioned at different locations within vehicle cabin 101. For example, information panels 102 may be positioned on the backs of seats, on the center console, on the steering wheel, on the ceiling of cabin 101, on the front windshield, on the side windshields, or at any other location within driving apparatus 100.

As shown, driving apparatus 100 can comprise customizable components 106. Some customizable components 106 in the driving apparatus 100 may have one or more settings that can define corresponding modes of operations for those customizable components 106. Examples of those customizable components 106 may include driving mode of an engine of driving apparatus 100 (e.g., sports or economy mode), automatic headlight mode (e.g., daytime running mode, tunnel light mode), light intensity on dashboard display(s), airbag mode, cruise control, camera mode and/or another components that can be customized to operate in a particular mode for a given user of the driving apparatus 100.

Some customizable components 106 in the driving apparatus 100 may have one or more settings that can define a position and/or an operational angle of those components. Examples of such customizable components 106 may include one or more seats (front and/or rear), one or more seat belts, one or more mirrors, a steering wheel, one or more windows and accessories thereto, and/or any other customizable components whose position(s) or angle(s) can be adjusted.

Some customizable components 106 in the driving apparatus 100 may have one or more settings that can define a starting point of the customizable components. Examples of such components may include mirrors, seats, radio (e.g., start station, start volume, etc.), headlights, brakes, engine (e.g., economy or sports mode), a navigation system (e.g., language, voice guide volume, voice guide accent), climate control (e.g., start temperature, wind strength, wind direction, humidity, and so on), and/or any other customizable components 106 that has a configurable initial state of operation. Other examples of customizable components 106 are contemplated.

As still shown, driving apparatus 100 can facilitate multiple users 108 to personalize their settings of information panel 102. The users may include one or more drivers of the driving apparatus 100 and/or one or more passengers of the driving apparatus 100. As mentioned above, separate biometric information capturing devices 105 can be provided to different types of users of driving apparatus 100. For example, without limitation, the biometric information capturing device 105 can be provided to the driver(s) of the driving apparatus 100 for storing, recalling, and/or updating the personalized settings of customizable components 106 associated with the driver(s); and the biometric information capturing device 105 can be provided to the passenger(s) of the driving apparatus 100 for storing, recalling, and/or updating personalized settings of the customizable components 106 associated with the passenger(s).

It should be understood that driving apparatus 100 in accordance with this disclosure is not necessarily limited to an automobile. Other types of driving apparatus 100 are contemplated. For example, the driving apparatus 100 can be a train, a bus, a vessel, a motorcycle, an electronic bike, a rocket ship, an airplane, and/or any other types of apparatus that can move in distance.

Figure 2:
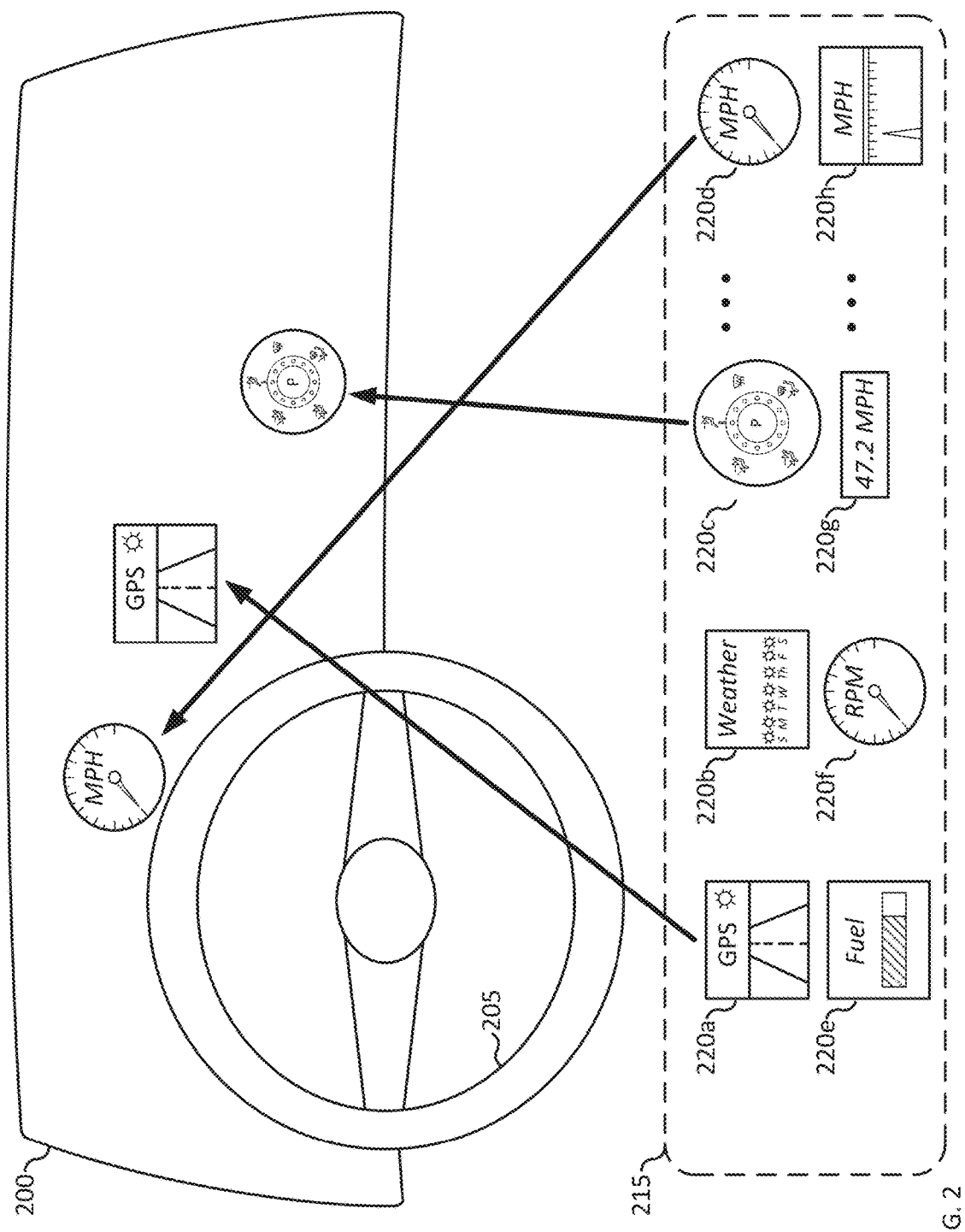
FIG. 2 illustrates a vehicle information panel, according to an exemplary embodiment of the present disclosure.

FIG. 2 illustrates an information panel 200, according to an exemplary embodiment of the present disclosure. Information panel 200 as shown in FIG. 2 is positioned on the dashboard of a vehicle above steering wheel 205. In other embodiments, information panel 200 may be positioned at other locations within a vehicle.

In some embodiments, a user is able to design a personalized information panel by selecting one or more display items 220 from a display item palette 215 and placing them onto a designable area, or blank space. There are various methods through which a user of a vehicle may interact with information panel 200. For example, in some embodiments a user may create his/her personalized settings for the information panel on a personal computer or a smart phone while being remote from the vehicle. In some embodiments, a user may create personalized settings using a touch screen that is incorporated into the information panel.

In some embodiments, different display item palettes may contain different types of display items 220. For example, a first display item palette may contain only display items relating to controllers and a second display item palette may contain only display items relating to gauges. Furthermore, some display item palettes may relate to entertainment display items, e.g., radio, news, sports scores, media player, etc. As discussed above, new display items and display item palettes may be downloaded from the internet to a computing device, or directly to information panel 200. In some embodiments, display item palette 215 may contain multiple display items 220 for the same kind of controller or gauge. For example, display items 220d, 220g, and 220h are different representations of a speedometer. In some embodiments, if a user is not satisfied with these options of speedometers, he/she may, using a computing device or a touch screen incorporated into information panel 200, select an option for showing or downloading more display items of that type.

Figure 3:
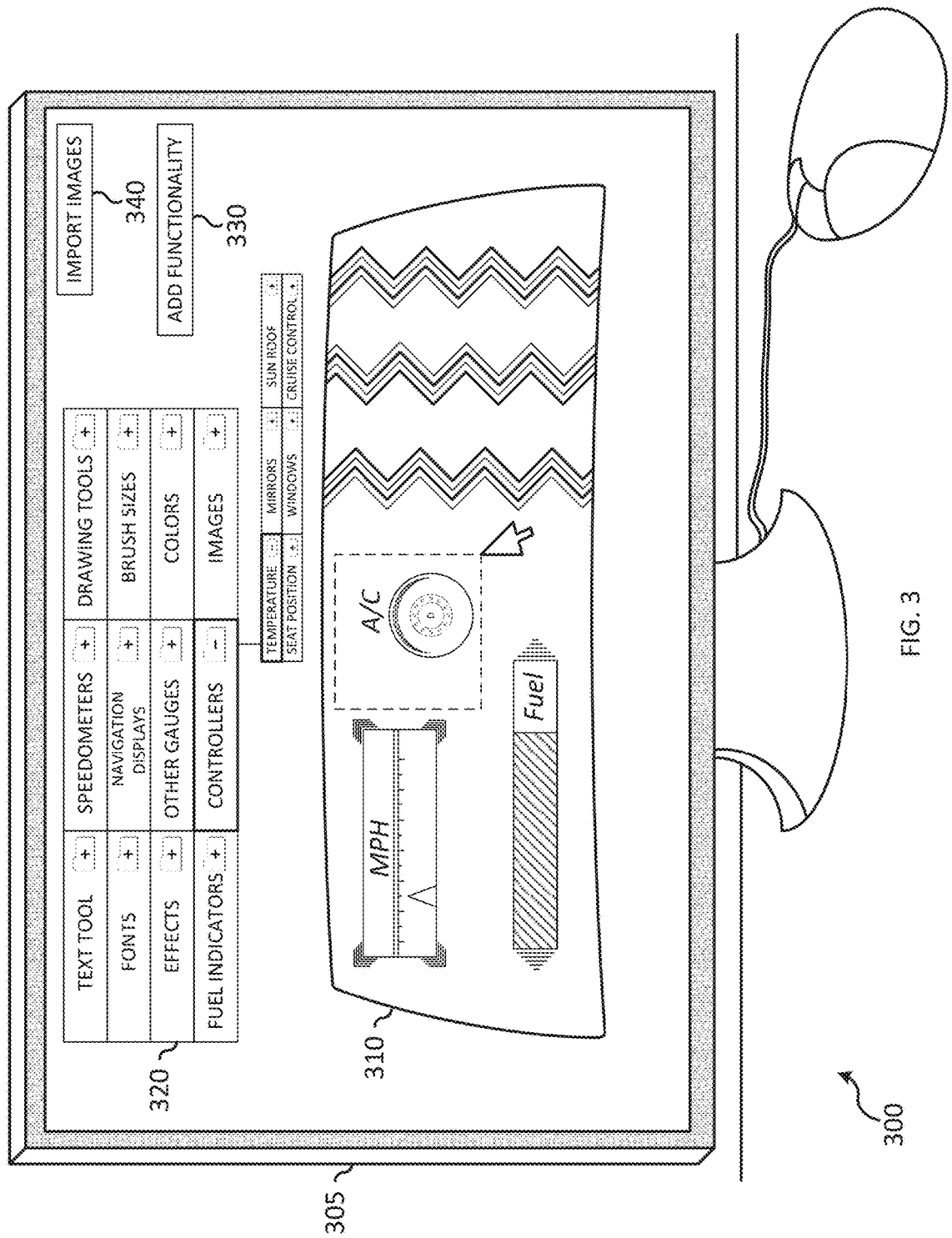
FIG. 3 illustrates a computing interface, according to an exemplary embodiment of the present disclosure.

FIG. 3 illustrates a computing interface 300, according to an exemplary embodiment of the present disclosure. In some embodiments, computing interface 300 may comprise a personal computer 305 through which a user may design and organize one or more personalized information panel configurations using an editing application. The editing application may give a user the ability to fully modify the visual appearance and underlying functionality of an information panel configuration. The editing application may provide a wide range of editing tools 320, which may include, text tools, fonts, effects, fuel indicators, speedometers, navigation displays, gauges, controllers (including temperature, seat position, mirrors, windows, sun roof, cruise control), drawing tools, brush sizes, colors, images, among others. Some of editing tools 320, such as gauges and controllers, correspond to display items that have underlying functionality that are linked to certain metrics regarding vehicle operation or performance.

Some of editing tools 320, such as controllers, correspond to display items that have underlying functionality that are linked to user input. For example, a temperature controller may be selected through the editing tools 320 by selecting the "CONTROLLERS" folder followed by selecting the "TEMPERATURE" subfolder. A temperature controller may be placed onto information panel 310 through a drag and drop operation or through other means. Once the information panel configuration is saved by the user and loaded onto an information panel inside a vehicle, the user may adjust the temperature of the vehicle by placing his/her finger onto a touch screen incorporated into the information panel and moving his/her finger accordingly.

Although operation of controllers through a touch screen incorporated into the information panel may be the primary mode of user input, there may be situations where incorporating a touch screen into the information panel is not feasible, and other means of user input may be available. For example, the user identifying device 104 may be configured to allow users to interact with controllers. For example, a keypad, as discussed in relation to FIG. 1, may be configured to select a desired air temperature in the vehicle, or to select a cruise control setting. Furthermore, controllers may be modified by voice activation where the user identifying device 104 is a microphone, or when a secondary microphone is located in the vehicle.

Some of editing tools 320 may not deal with display items with underlying functionality, but may deal with modifying information panel 310 from a purely aesthetic perspective. In some embodiments, users may modify information panel 310 on a pixel-based editing approach, where information panel 310 is treated as a raster graphics image with a rectangular grid of pixels. Users may select various editing tools 320 to modify pixels of information panel 310, such as brushes, line drawers, shape drawers, fill tools, text tools, image effects, etc. In some embodiments, users may modify information panel 310 on a vector-based editing approach, where mathematical expressions are used to represent different modifications to an image. In vector graphics, geometric primitives, such as points, lines, and shapes, are represented by a series of vectors with through locations called nodes. Images that are modified using a vector-based editing approach have the advantage of being more efficiently resized without loss of image clarity. Furthermore, later editing of vector graphics is more feasible than raster images, as mathematical representations of each edit to a vector graphic may be saved.

Additional editing tools may exist in addition to editing tools 320 that are listed in FIG. 3. Users may apply a wide range of filters and customizations to information panel 310, and may use the editing tools in a way that causes the editing tools that deal with underlying functionality to interact with the editing tools that primarily affect the aesthetic nature of the image. For example, users may place a gauge or controller onto information panel 310 with a default physical layout, and then edit the default layout by adding additional features and embellishments. Alternatively, users may create a gauge or controller from scratch by adding a group of geometric primitives and then selecting button 330 to add functionality. Adding functionality to a group of geometric primitives may include linking certain metrics regarding vehicle operation or performance to some spatial characteristic of the group of geometric primitives. For example, the added functionality may be linking the percentage of fuel left in the vehicle's fuel tank to the length and position of a rectangle. If X is a variable representing the percentage of fuel left in the fuel tank, L is the length of the rectangle, and P is the horizontal position of the rectangle from the left edge of information panel 310, then L and P may be expressed by the formulas: L=5000X and P=2000, where L and P are in units of pixels.

In some embodiments, computing interface 300 may also facilitate a user to add functionality to information panel 310 based on external variables that are unrelated to vehicle operation or performance. For example, a user may create an image of a sun, or import an image of a sun via button 340, and link the horizontal position of the image to the current time of day. Users may also create multiple information panel configurations and program each configuration for different driving conditions. A first information panel configuration might be activated for a certain user during night time driving conditions, while a second information panel configuration might be activated during the day. By way of another example, a certain user may want to create seven different information panel configurations and activate each on different days of the week. Functionality may be added to different information panel configurations based on other factors as well, including location, outside temperature, number of people in the vehicle, time of day, month of the year, whether the vehicle is parked or moving, etc.

Information panel 310 of FIG. 3 shows an example of a possible information panel configuration that may be created using computing interface 300. Information panel 310 displays a customized graphic with two gauges (speedometer and fuel indicator), one controller (air temperature), and several embellishments of the gauges and white space of information panel 310. A visual inspection of information panel 310 may not necessary reveal how several of the aesthetic features may in fact be functional elements that are linked to certain metrics regarding vehicle operation or performance. For example, the embellishments surrounding the speedometer of information panel 310 may be linked to vehicle speed, and may expand or contract as a function of vehicle speed. By way of another example, the color of the fuel indicator may be linked to the percentage of fuel left in the vehicle's fuel tank. The color may initially be a soft blue when the percentage is at 100%, but may progress toward a bright red as the percentage approaches 0%.

Figure 4:
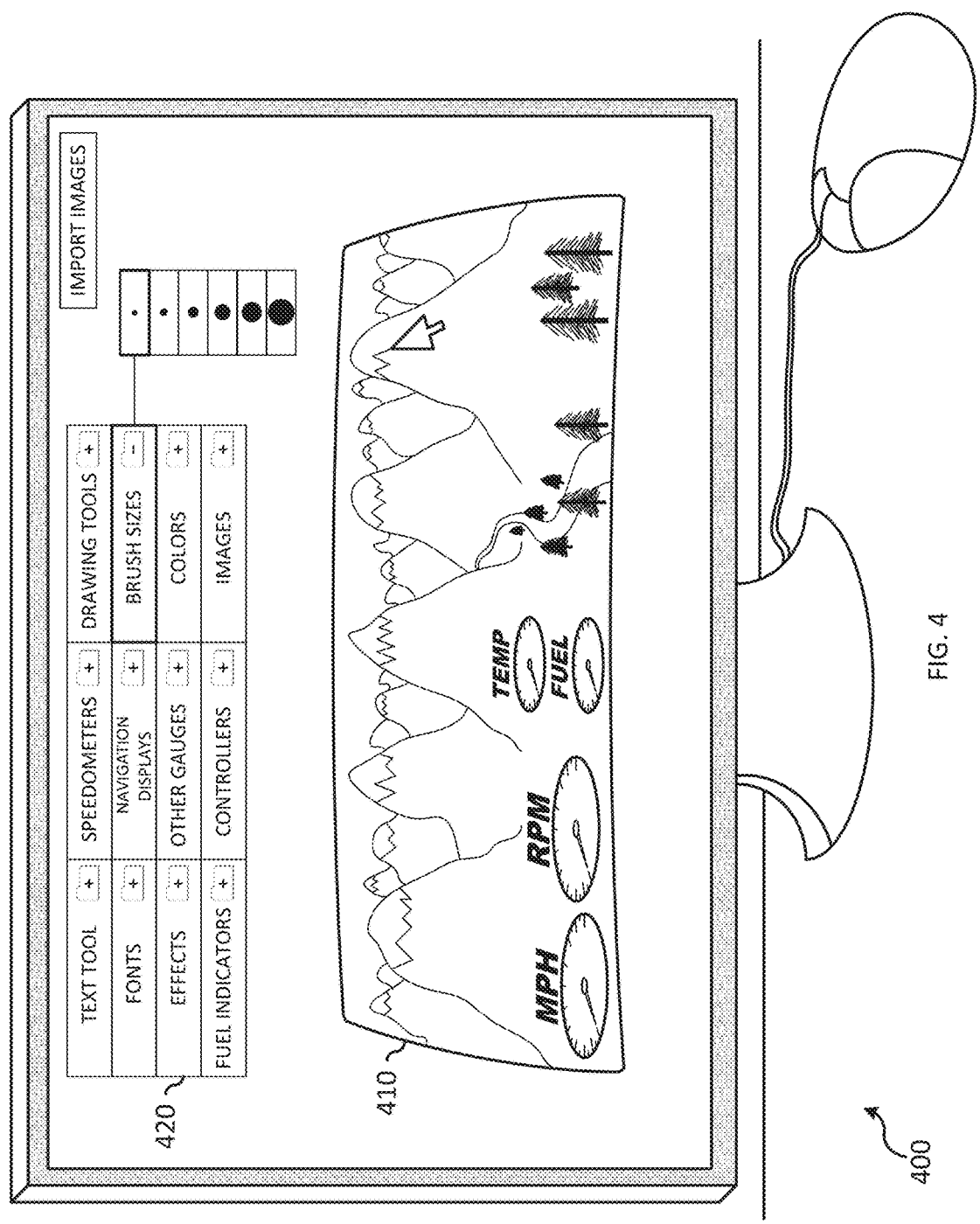
FIG. 4 illustrates a computing interface, according to an exemplary embodiment of the present disclosure.

FIG. 4 illustrates a computing interface 400, according to an exemplary embodiment of the present disclosure. Information panel 410 shows an example of a possible information panel configuration that may be created using computing interface 400. Information panel 410 displays a customized graphic with four gauges (speedometer, tachometer, temperature, and fuel indicator) and other embellishments. Computing interface 400 demonstrates the pixel-based editing approach where a user is able to select "BRUSH SIZES" from the editing tools 320 and is able to directly modify pixels of the customized graphic of information panel 410 based on the brush size that is selected.

Figure 5:
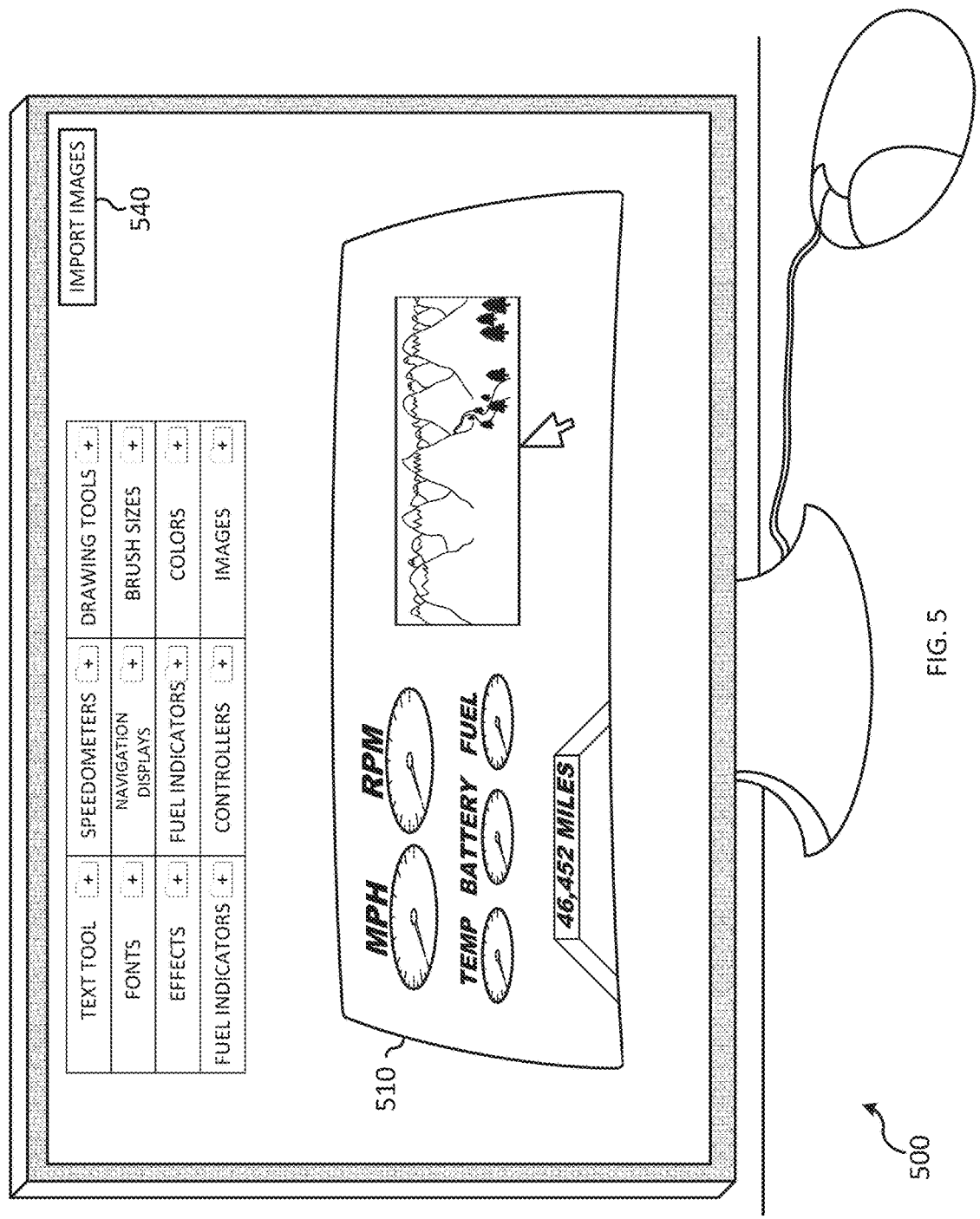
FIG. 5 illustrates a computing interface, according to an exemplary embodiment of the present disclosure.

FIG. 5 illustrates a computing interface 500, according to an exemplary embodiment of the present disclosure. Information panel 510 shows an example of a possible information panel configuration that may be created using computing interface 500. Information panel 510 displays a customized graphic with six gauges (speedometer, tachometer, temperature, battery, fuel indicator, and odometer) and other embellishments. Computing interface 500 demonstrates how a user may import an image via button 340 to customize information panel 510. In addition to images, users may import display items with underlying functionality, such as gauges and controllers.

Figure 6:
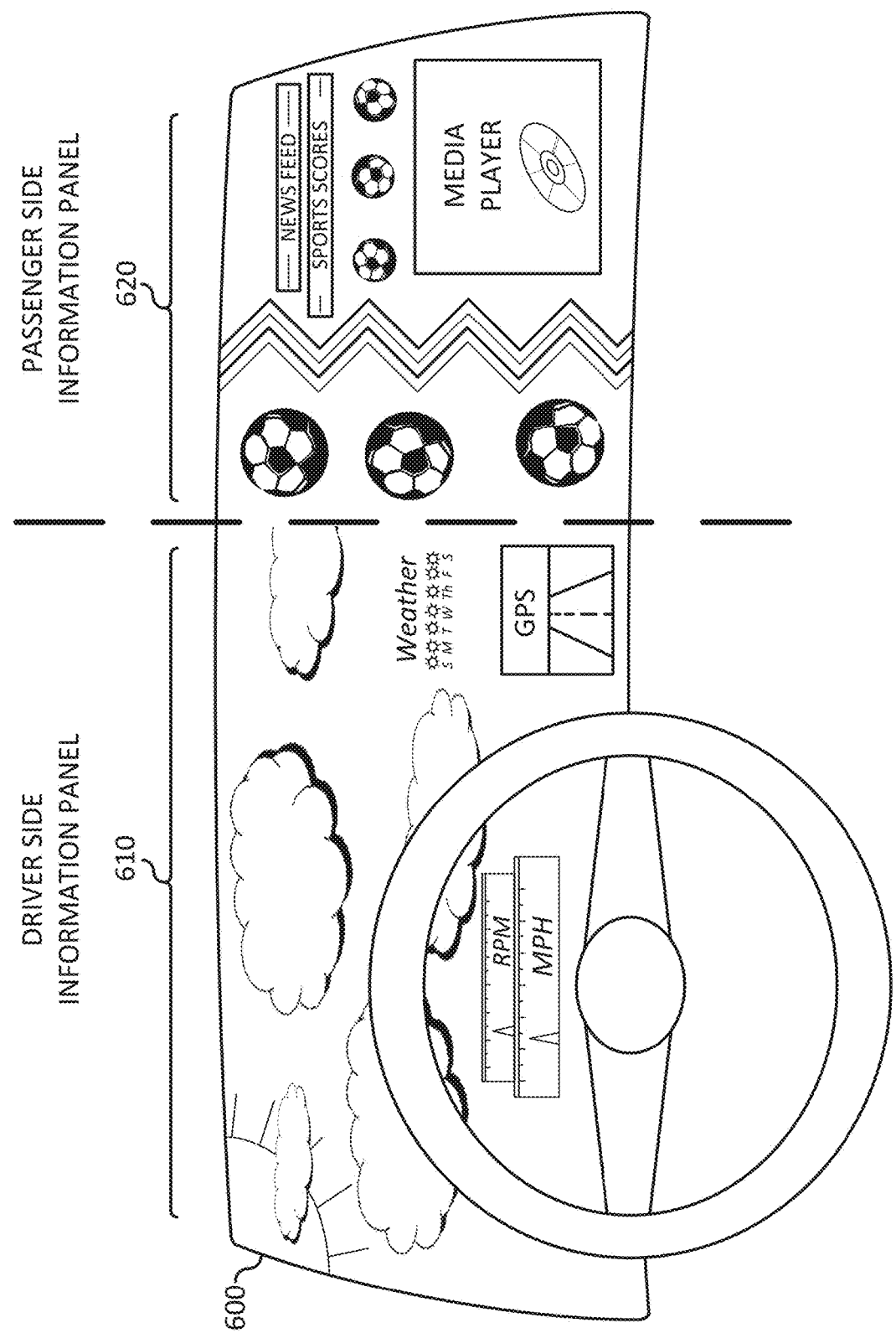
FIG. 6 illustrates a vehicle information panel with partitioning between the driver side and the passenger side, according to an exemplary embodiment of the present disclosure.

FIG. 6 illustrates a vehicle information panel 600 with partitioning between the driver side and the passenger side, according to an exemplary embodiment of the present disclosure. In some embodiments, it may be advantageous to partition information panel 600 into a driver side information panel 610 and a passenger side information panel 620 in order to facilitate access to information panel 600 by users of the vehicle other than the driver. In this example, a driver may configure a customized graphic corresponding to the left portion of information panel 600 and a passenger may configure a customized graphic corresponding to a right portion of information panel 600.

As an example of an embodiment of FIG. 6, a first user of a vehicle may have four different information panel configurations that may be activated when he/she is identified as being in the vehicle. A first configuration may be activated when it is determined that the first user is in the driver's seat of the vehicle and there is no passenger in the vehicle. The first configuration may contain a customized graphic for all of information panel 600. A second configuration may be activated when it is determined that the first user is in the driver's seat of the vehicle and there is a passenger in the vehicle. The second configuration may contain a customized graphic corresponding to a left portion of information panel 600, e.g., driver side information panel 610. A third configuration may be activated when it is determined that the first user is sitting on the passenger side of the vehicle and there is also someone in the driver's seat. The third information panel configuration may contain a customized graphic corresponding to a right portion of information panel 600, e.g., passenger side information panel 620. Finally, a fourth configuration may be activated when it is determined that the first user is sitting on the passenger side of the vehicle and there is no driver in the vehicle (for example, when the driver goes into a store and the passenger remains in the vehicle). The fourth information panel configuration may contain a customized graphic for all of information panel 600. For example, the fourth configuration may enable a passenger who was previously watching a movie only on the passenger side information panel 620 to expand the movie to the entire information panel 600 when the driver is not in the vehicle.

Figure 7:
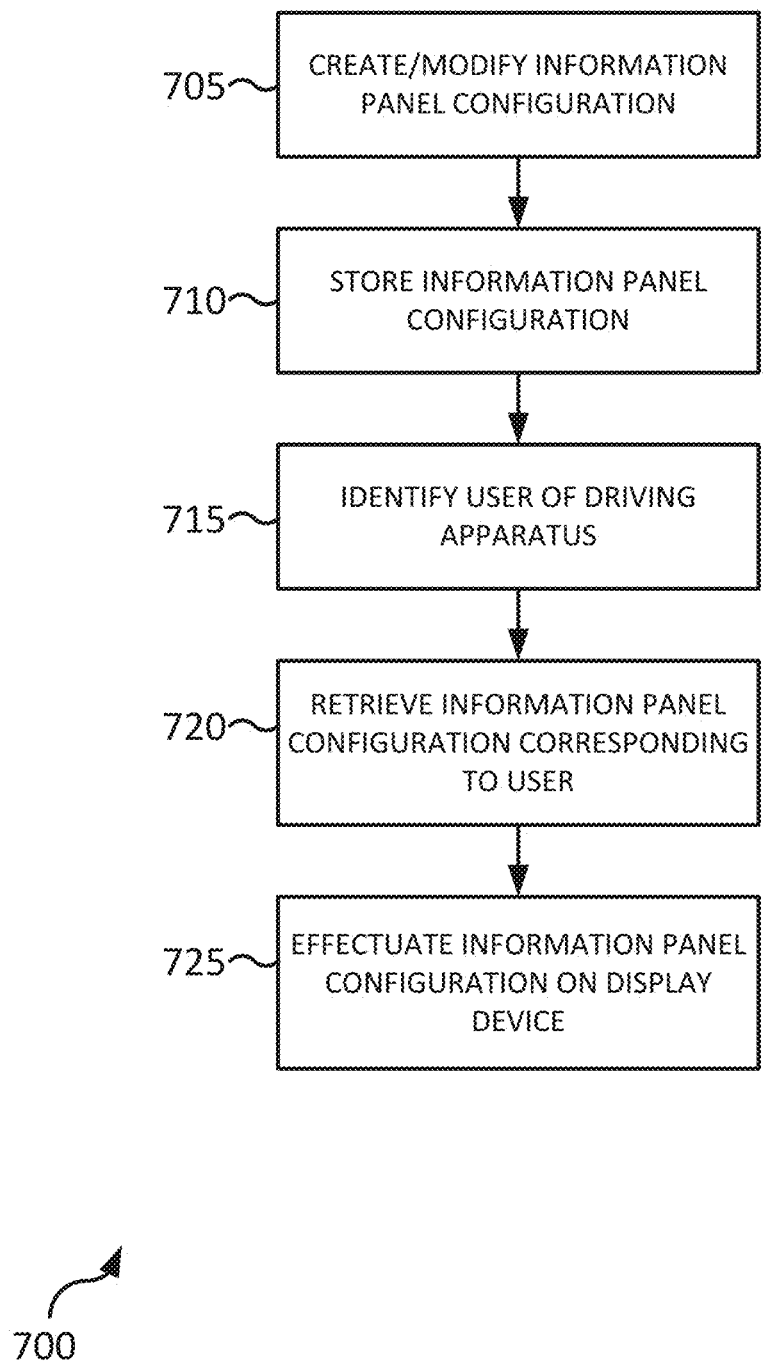
FIG. 7 illustrates a block diagram of a method for facilitating a user to configure an information panel in a driving apparatus, according to an exemplary embodiment of the present disclosure.

FIG. 7 illustrates a block diagram of a method 700 for facilitating a user to configure an information panel in a driving apparatus, according to an exemplary embodiment of the present disclosure. Method 700 will be described in reference to FIGS. 1-6. The operations of method 700 presented below are intended to be illustrative. In some embodiments, method 700 may be accomplished with one or more additional operations not described and/or without one or more of the operations discussed. Additionally, the order in which the operations of method 700 are illustrated in FIG. 7 and described below is not intended to be limiting.

At block 705, a user of a driving apparatus creates a new information panel configuration or modifies an existing one. The user may interact with the information panel to create or modify an information panel configuration through various methods, including but not limited to, a touch screen incorporated into the information panel, a personal computer, a smart phone, and other remote or in-vehicle computing devices. A user may add color, shape, or text modifications to a customized graphic, as described in reference to FIG. 3. The modifications may be dependent on different metrics regarding vehicle operation or performance At block 710, the information panel configuration is stored either locally within the driving apparatus or on a remote server. In some embodiments, information panel configurations associated with different users are transmitted to a remote server by initiating requests to transmit by processor 103 followed by actual transmission of the information panel configurations, as described in reference to FIG. 1. A single user may have multiple information panel configurations with which he/she is associated with, as described in reference to FIG. 6. At block 715, the user of the driving apparatus is identified. User identification is performed by a user identifying device, as described in reference to FIG. 1. However, the user identifying device need not be a biometric information capturing device. A user may identify himself by entering his information into the information panel or some other input device (e.g., keypad), or the user may provide his biometric information to a input device for further processing by the processor.

At block 720, the information panel configuration that was created or modified by the user is retrieved. In some embodiments, information panel configurations associated with different users stored on a remote server may be retrieved by initiating requests to the server by processor 103, as described in reference to FIG. 1. Information panel configurations stored locally may be retrieved by searching a memory component that is operatively coupled with processor 103. At block 725, the information panel configuration is effectuated on a display device within the driving apparatus. The display device may be an electronic display that spans the dashboard of the driving apparatus. The display device may also be positioned on the backs of seats, on the center console, on the steering wheel, on the ceiling, or at any other location within the driving apparatus, as described in reference to FIG. 1.

Figure 8:
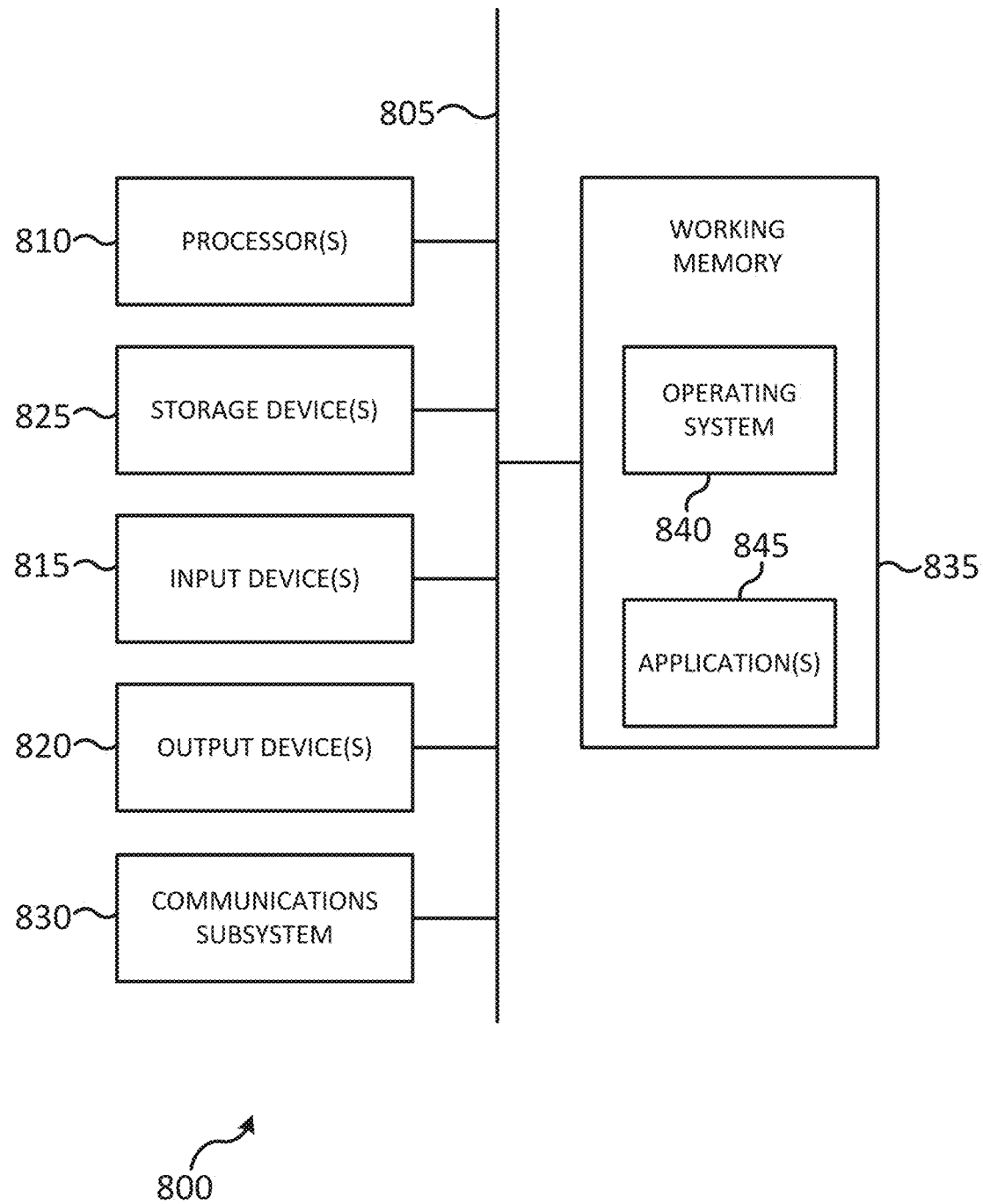
FIG. 8 illustrates a simplified computer system, according to an exemplary embodiment of the present disclosure.

FIG. 8 illustrates a simplified computer system, according to an exemplary embodiment of the present disclosure. A computer system 800 as illustrated in FIG. 8 may be incorporated into devices such as a portable electronic device, mobile phone, or other device as described herein. FIG. 8 provides a schematic illustration of one embodiment of a computer system 800 that can perform some or all of the steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805, or may otherwise be in communication, as appropriate. The hardware elements may include one or more processors 810, including without limitation one or more general-purpose processors and/or one or more special-purpose processors such as digital signal processing chips, graphics acceleration processors, and/or the like; one or more input devices 815, which can include without limitation a mouse, a keyboard, a camera, and/or the like; and one or more output devices 820, which can include without limitation a display device, a printer, and/or the like.

The computer system 800 may further include and/or be in communication with one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 830 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 830. In other embodiments, a portable electronic device, e.g. the first electronic device, may be incorporated into the computer system 800, e.g., an electronic device as an input device 815. In some embodiments, the computer system 800 will further comprise a working memory 835, which can include a RAM or ROM device, as described above.

The computer system 800 also can include software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 8, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 825 described above. In some cases, the storage medium might be incorporated within a computer system, such as computer system 800. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 800 to perform methods in accordance with various embodiments of the technology. According to a set of embodiments, some or all of the procedures of such methods are performed by the computer system 800 in response to processor 810 executing one or more sequences of one or more instructions, which might be incorporated into the operating system 840 and/or other code, such as an application program 845, contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium.

Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 and/or components thereof generally will receive signals, and the bus 805 then might carry the signals and/or the data, instructions, etc. carried by the signals to the working memory 835, from which the processor(s) 810 retrieves and executes the instructions. The instructions received by the working memory 835 may optionally be stored on a non-transitory storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A system configured to facilitate a user to configure and retrieve personalized settings for a fully designable information panel in a driving apparatus, the system comprising a processor configured to perform:
    storing, by the processor, a plurality of information panel configurations for users of the driving apparatus, the plurality of information panel configurations including a first information panel configuration for a first user of the driving apparatus and a second information panel configuration for a first user of the driving apparatus, and wherein:
        the first information panel configuration includes graphic customized by the first user; and
        the second information panel configuration includes graphic customized by the first user;
    determining whether the first user is present in the driving apparatus and whether the first user is on a passenger side of the driving apparatus
    in response to determining the first user is on the driver side of the driving apparatus, displaying a first information panel at the driver side of the driving apparatus and facilitating by the processor, the first user to configure the first information panel on the display device by modifying the first information panel configuration;
    in response to determining the first user is on the passenger side of the driving apparatus, displaying a second information panel at the passenger side of the driving apparatus and facilitating, by the processor, the first user to configure the second information panel on the display device by modifying the second information panel configuration.

2. The system of claim 1, wherein graphics in the first and second information panels includes either a vehicle gauge or a controller.

3. The system of claim 2, wherein graphics in the first and second information panels were previously modified using either a pixel-based editing approach or a vector-based editing approach.

4. The system of claim 1, wherein the processor is configured to perform:
    in response to determining the first user is on the driver side of the driving apparatus, retrieving the first information panel configuration;
    in response to determining the first user is on the passenger side of the driving apparatus, retrieving the second information panel configuration.

5. The system of claim 1, wherein determining whether the first user is present in the driving apparatus and whether the first user is on the driver side of the driving apparatus receiving biometric information regarding the first user.

6. The system of claim 1, wherein determining whether the first user is present in the driving apparatus and whether the first user is on the passenger side of the driving apparatus includes receiving information from an input device configured to allow the first user to indicate the first user is on the passenger side of the driving apparatus to identify themselves.

7. The system of claim 6, wherein the input device is a touch screen incorporated into the display device.

8. The system of claim 1, wherein storing the plurality of information panel configurations for users of the driving apparatus includes storing the plurality of information panel configurations in a remote storage over a network.

9. A computer-method for configuring a driving apparatus, the method comprising:
    storing, by a processor, a plurality of information panel configurations for users of the driving apparatus, the plurality of information panel configurations including a first information panel configuration for a first user of the driving apparatus and a second information panel configuration for a first user of the driving apparatus, and wherein:
        the first information panel configuration includes graphic customized by the first user; and
        the second information panel configuration includes graphic customized by the first user;
    determining whether the first user is present in the driving apparatus and whether the first user is on a driver side of the driving apparatus;
    in response to determining the first user is on the driver side of the driving apparatus, displaying a first information panel at the driver side of the driving apparatus and facilitating, by the processor, the first user to configure the first information panel on the display device by modifying the first information panel configuration; and
    in response to determining the first user is on the passenger side of the driving apparatus, displaying a second information panel at the passenger side of the driving apparatus and facilitating, by the processor, the first user to configure the second information panel on the display device by modifying the second information panel configuration.

10. The method of claim 9, wherein graphics in the first and second information panels includes either a vehicle gauge or a controller.

11. The method of claim 10, wherein graphics in the first and second information panels were previously modified using either a pixel-based editing approach or a vector-based editing approach.

12. The method of claim 9, further comprising:
    in response to determining the first user is on the driver side of the driving apparatus, retrieving the first information panel configuration;
    in response to determining the first user is on the passenger side of the driving apparatus, retrieving the second information panel configuration.

13. The method of claim 9, wherein determining whether the first user is present in the driving apparatus and whether the first user is on the driver side of the driving apparatus receiving biometric information regarding the first user.

14. The method of claim 9, wherein storing the plurality of information panel configurations for users of the driving apparatus includes storing the plurality of information panel configurations in a remote storage over a network.

15. A non-transitory processor-readable medium comprising instructions that, when executed by one or more processors, cause the one or more processors to perform:
    storing, by the processor, a plurality of information panel configurations for users of the driving apparatus, the plurality of information panel configurations including a first information panel configuration for a first user of the driving apparatus and a second information panel configuration for a first user of the driving apparatus, and wherein:
  the first information panel configuration includes graphic customized by the first user; and
  the second information panel configuration includes graphic customized by the first user;
determining whether the first user is present in the driving apparatus and whether the first user is on a driver side of the driving apparatus;
in response to determining the first user is on the driver side of the driving apparatus, displaying a first information panel at the driver side of the driving apparatus and facilitating by the processor, the first user to configure the first information panel on the display device by modifying the first information panel configuration; and
in response to determining the first user is on the passenger side of the driving apparatus, displaying a second information panel at the passenger side of the driving apparatus and facilitating, by the processor, the first user to configure the second information panel on the display device by modifying the second information panel configuration.

16. The non-transitory processor-readable medium of 15, wherein the plurality of color, shape, or text modifications include a modification of either a vehicle gauge or controller.

17. The non-transitory processor-readable medium of 15, wherein the instructions that, when executed by one or more processors, cause the one or more processors to perform:
  in response to determining the first user is on the driver side of the driving apparatus, retrieving the first information panel configuration;
  in response to determining the first user is on the passenger side of the driving apparatus, retrieving the second information panel configuration.

18. The non-transitory processor-readable medium of 15, wherein storing the plurality of information panel configurations for users of the driving apparatus includes storing the plurality of information panel configurations in a remote storage over a network.

* * * * *